(12) United States Patent
Wang

(10) Patent No.: US 6,439,280 B1
(45) Date of Patent: Aug. 27, 2002

(54) WORKING TABLE COMBINATION HAVING ATTACHABLE BOARDS

(76) Inventor: Tian Wang Wang, No. 45, Yi Chang East Road, Taiping City, Taichung Hsien (TW)

( * ) Notice: Subject to any disclaimer, the term of this patent is extended or adjusted under 35 U.S.C. 154(b) by 0 days.

(21) Appl. No.: 09/737,696

(22) Filed: Dec. 18, 2000

(51) Int. Cl.$^7$ .................................................. B25H 1/00
(52) U.S. Cl. ........................ 144/287; 83/438; 83/477.2; 108/64; 144/286.1; 269/318
(58) Field of Search ........................ 83/435.11, 435.27, 83/477.2, 468.7, 438; 108/64, 65; 144/1.1, 286.7, 286.5, 287; 269/289 R, 309, 318

(56) References Cited

U.S. PATENT DOCUMENTS

| | | | | |
|---|---|---|---|---|
| 3,695,189 A | * | 10/1972 | Felder, Jr. .................... | 144/287 |
| 4,599,927 A | * | 7/1986 | Eccadt et al. ............... | 83/477.2 |
| 4,696,213 A | * | 9/1987 | Conneally ..................... | 83/438 |
| 4,955,941 A | * | 9/1990 | Rousseau ..................... | 108/65 |
| 5,116,249 A | * | 5/1992 | Shiotani et al. ............. | 144/287 |
| 5,487,445 A | | 1/1996 | Biehl .......................... | 182/181 |
| 5,647,258 A | * | 7/1997 | Brazell et al. ................ | 83/438 |
| 5,819,671 A | * | 10/1998 | Ocampo ................... | 108/65 X |
| 6,112,785 A | | 9/2000 | Yu ............................. | 144/287 |

* cited by examiner

Primary Examiner—W. Donald Bray
(74) Attorney, Agent, or Firm—Charles E. Baxley

(57) ABSTRACT

A working table device includes a base having a table plate supported on top, and one or more boards coupled to the table plate with one or more beams for increasing the working or supporting surfaces or areas for the work pieces and for smoothly supporting the work pieces on the table plate and the boards. The beams include one or more side channels for receiving fasteners and for securing to the table plate and the boards. One or more legs may be attached to the beams or to the boards for flushing the board with the table plate and for smoothly supporting the work pieces.

9 Claims, 6 Drawing Sheets

WORKING TABLE COMBINATION HAVING ATTACHABLE BOARDS

BACKGROUND OF THE INVENTION

1. Field of the Invention

The present invention relates to a working table, and more particularly to a working table combination having one or more auxiliary and attachable boards for increasing the working or supporting surfaces or areas for the work pieces.

2. Description of the Prior Art

Typical working tables, particularly the table saws, comprise a working table for supporting the work pieces. The working tables have a limited size or areas that may not be used for supporting some of the huge or large work pieces.

U.S. Pat. No. 5,487,445 to Biehl discloses a ball rail spaced from the working tables for supporting the large work pieces. However, the ball rail may not be solidly retained in place and may be easily tilted or may easily fall while in use.

U.S. Pat. No. 6,112,785 to Yu discloses the other type of the working tables having a sliding table for selectively attaching onto the working table. However, a rather complicated configuration is required for attaching the sliding table onto the working table.

The present invention has arisen to mitigate and/or obviate the afore-described disadvantages of the conventional working tables.

SUMMARY OF THE INVENTION

The primary objective of the present invention is to provide a working table combination including one or more auxiliary boards for increasing the working or supporting surfaces or areas for the work pieces.

In accordance with one aspect of the invention, there is provided a working table combination comprising a base including a table plate supported on top thereof, at least one board, and at least one beam secured to the table plate and to the board for securing the table plate and the board together.

The beam includes a side portion having a channel formed therein, and a plurality of fasteners engaged in the channels of the beam and engaged with the table plate and the board for securing the table plate and the board together.

The beam includes a guide slot formed therein, the working table combination further includes a slide slidably engaged with the guide slot of the beam for slidably securing to the table plate.

A supporting device is further provided for supporting the board at a level flush with the table plate and for smoothly supporting the work pieces on the table plate and the boards.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
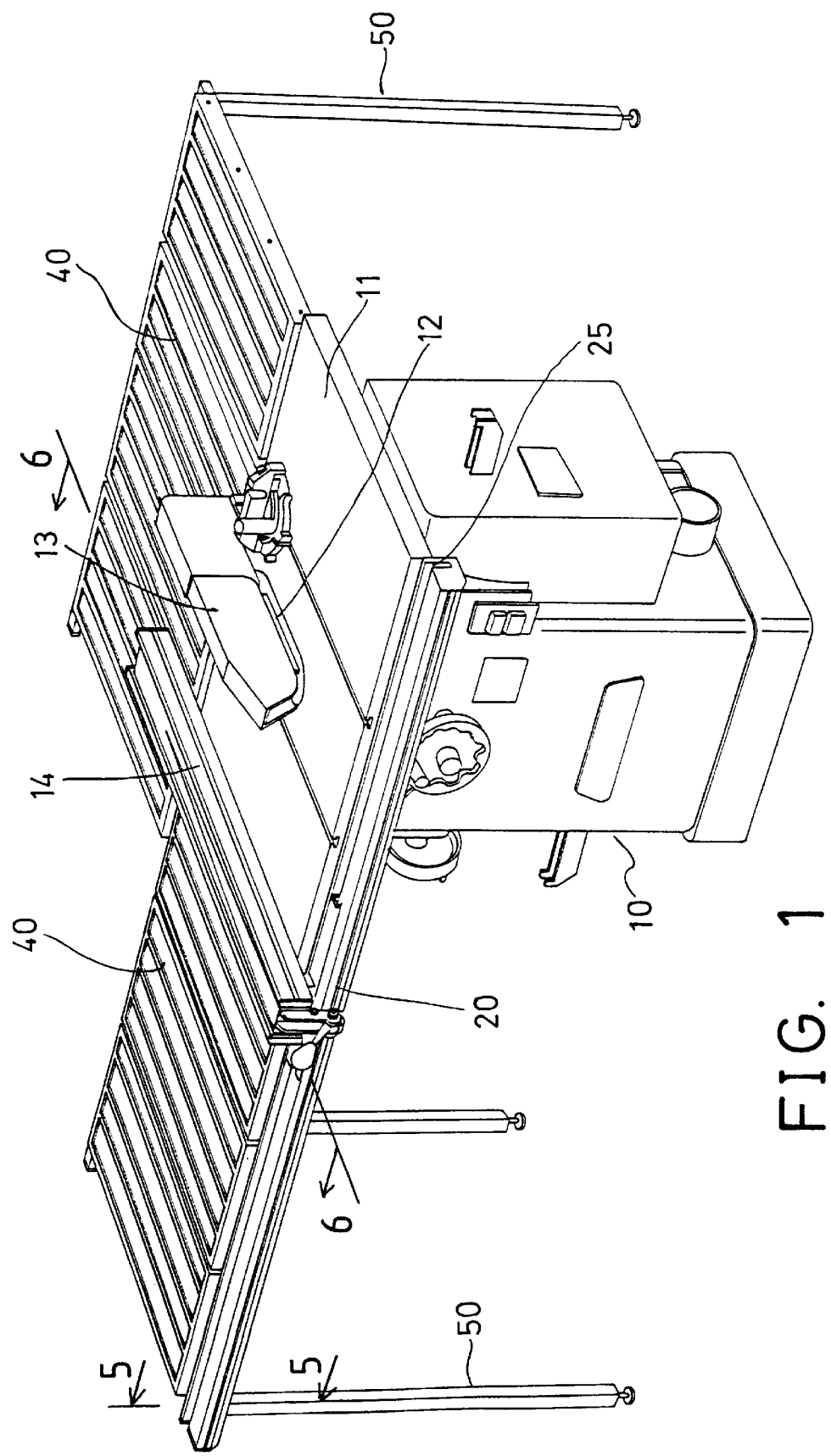
FIG. 1 is a perspective view of a working table combination in accordance with the present invention.

Referring to the drawings, and initially to FIG. 1, a working table combination in accordance with the present invention comprises a base 10, and a table plate 11 supported on top of the base 10 for supporting the work pieces. A tool member 12, such as a saw is received in the base 10 and slightly extended outward and upward beyond the table plate 11 for cutting or machining the work pieces. A cover 13 may be pivotally and/or detachably attached to the base 10 or to the table plate 11 and disposed above the tool member 12 for shielding the tool member 12 and for collecting the chips or the like and for preventing the cut chips from from flying everywhere and from hurting people. A slide 14 is slidably engaged on the table plate 11 with one or more guide tracks or the like for stably moving the work pieces toward and away from the tool member 12.

The working table combination in accordance with the present invention is to provide one or more further boards 40 for attaching to the table plate 11 and for increasing the working or supporting surfaces or areas for the work pieces. The working table combination comprises one or more coupling beams 20, 30 for coupling the boards 40 to the table plate 11 and/or for coupling the boards 40 together, and comprises one or more legs 50 selectively attached to the boards 40 for supporting the boards 40 at a selected level, that is preferable parallel to or flush with the table plate 11, and for smoothly supporting the work pieces on the table plate 11 and the boards 40.

Figure 5:
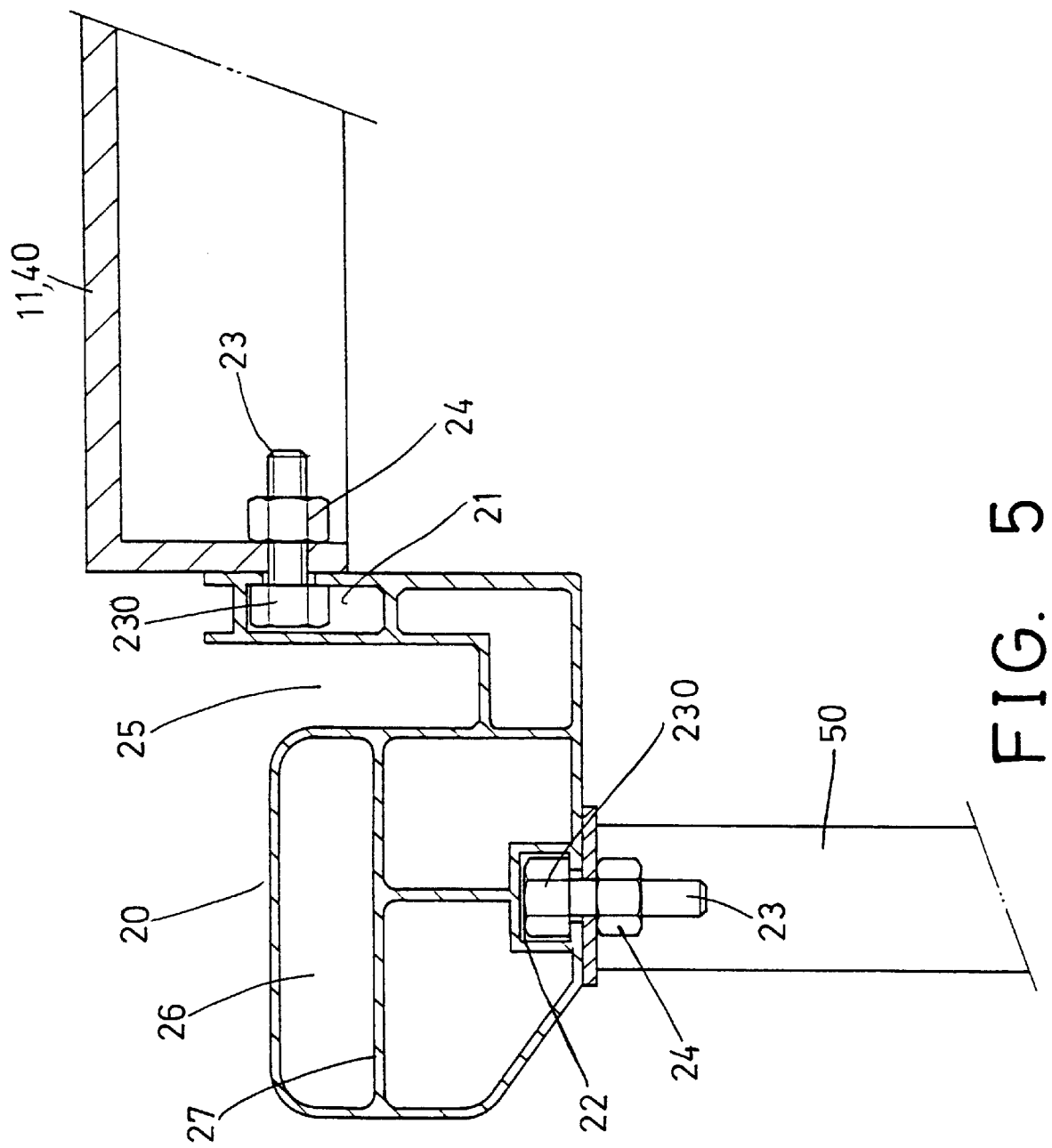
FIGS. 5 and 6 are partial cross sectional views taken along lines 5—5 and 6—6 of FIG. 1 respectively.
Figure 6:
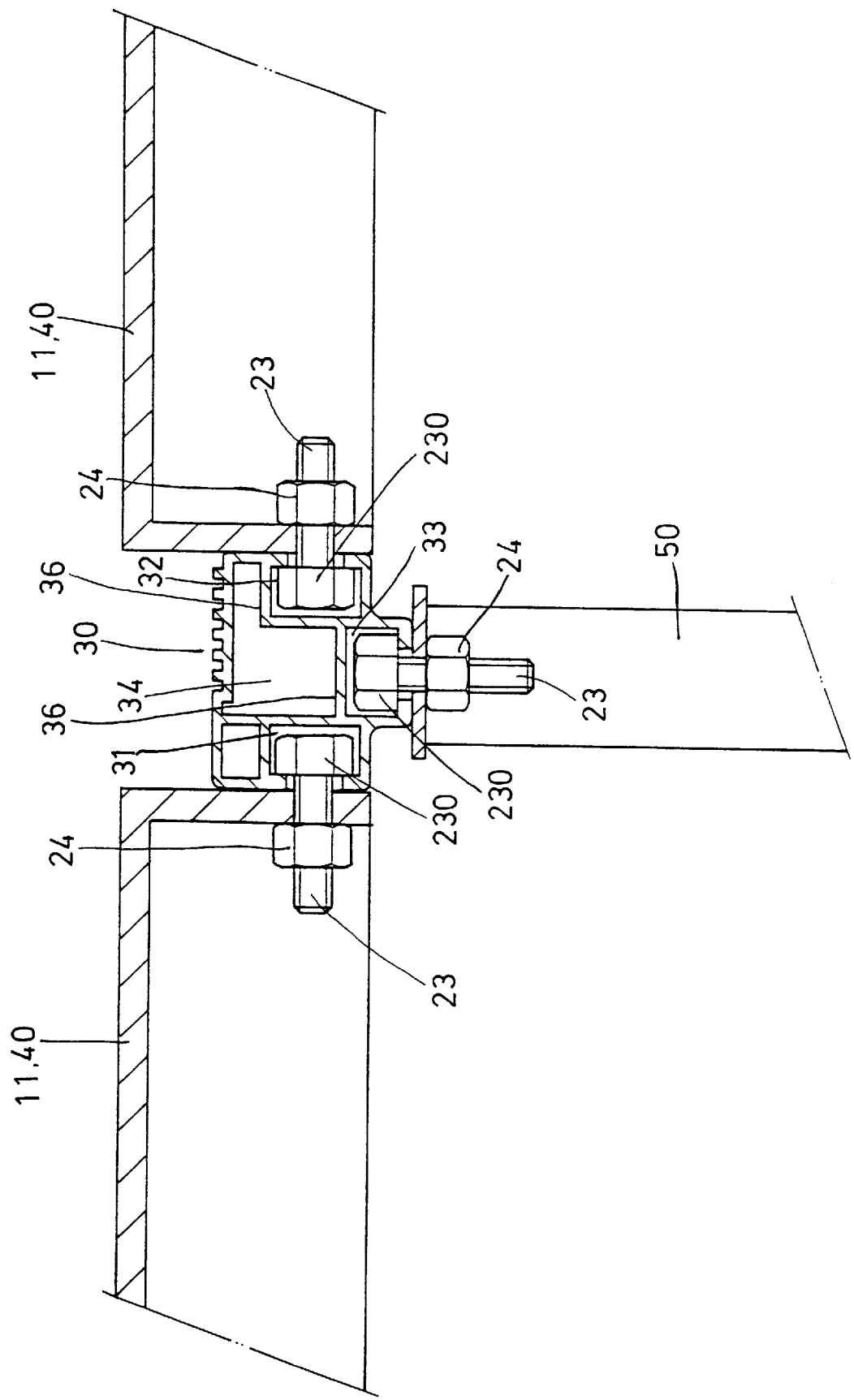

The beams 20, 30 each includes a bottom channel 22, 33 formed in the bottom thereof for receiving the heads 230 of the fasteners 23 (FIGS. 5, 6) which may engage with the legs 50 and may be threaded with the lock nuts 24 for selectively securing the legs 50 to the beams 20, 30. The beams 20, 30 include one or more side portions each having another channel 21, 31, 32 formed therein for receiving the heads 230 of the fasteners 23 (FIGS. 5, 6) which may engage with the table plate 11 and/or the boards 40 and which may be threaded with the lock nuts 24 for selectively securing the table plate 11 and the boards 40 to the beams 20, 30 and for selectively securing the boards 40 to the table plate 11 and/or for securing the boards 40 together. The beam 20 may include a guide slot 25 formed therein for slidably supporting and guiding the slide 14 to move relative to the table plate 11 and/or the boards 40.

Figure 2:
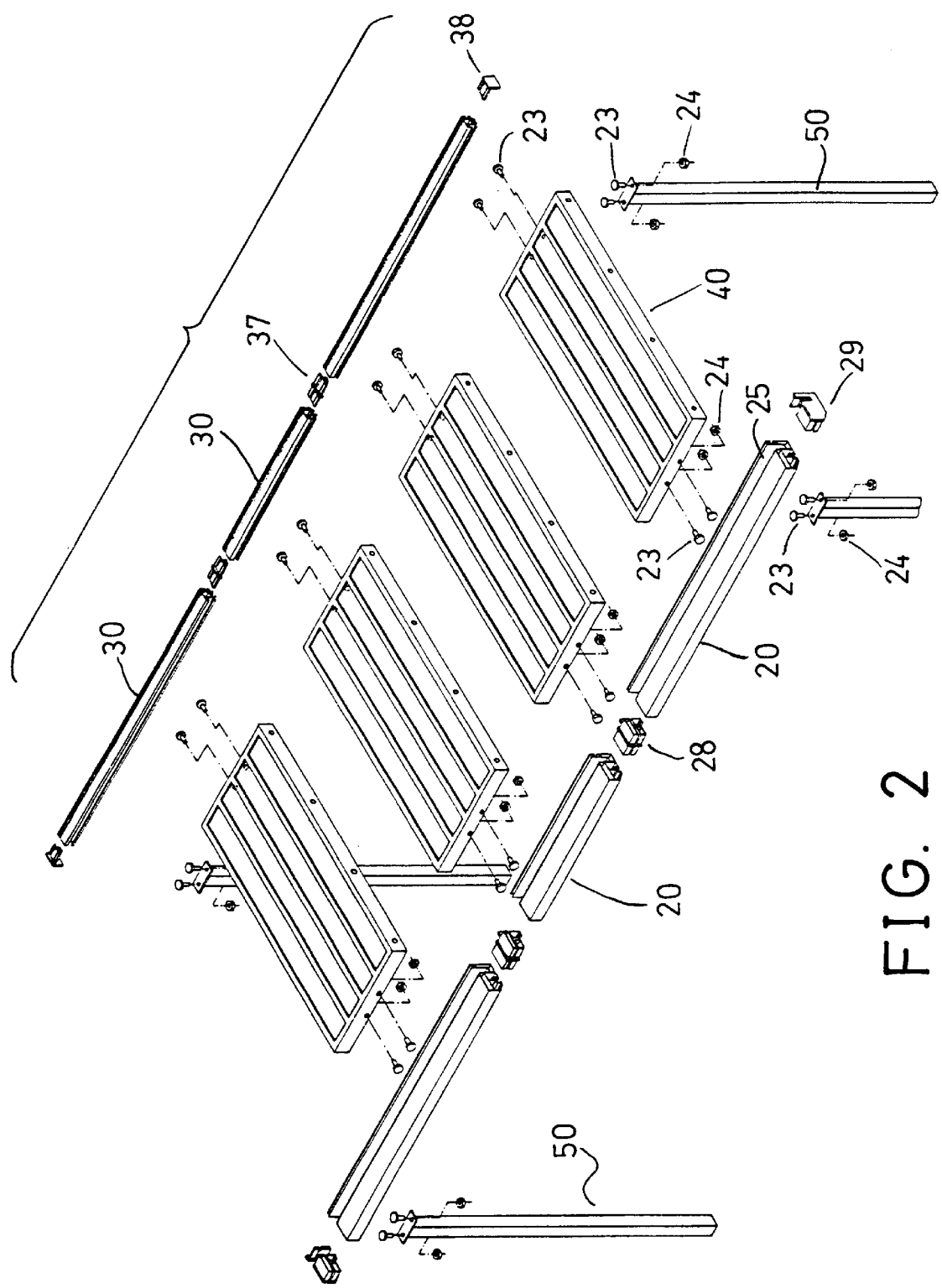
FIGS. 2, 3, 4 are partial exploded views of the auxiliary and attachable boards for the working table combination.
Figure 3:
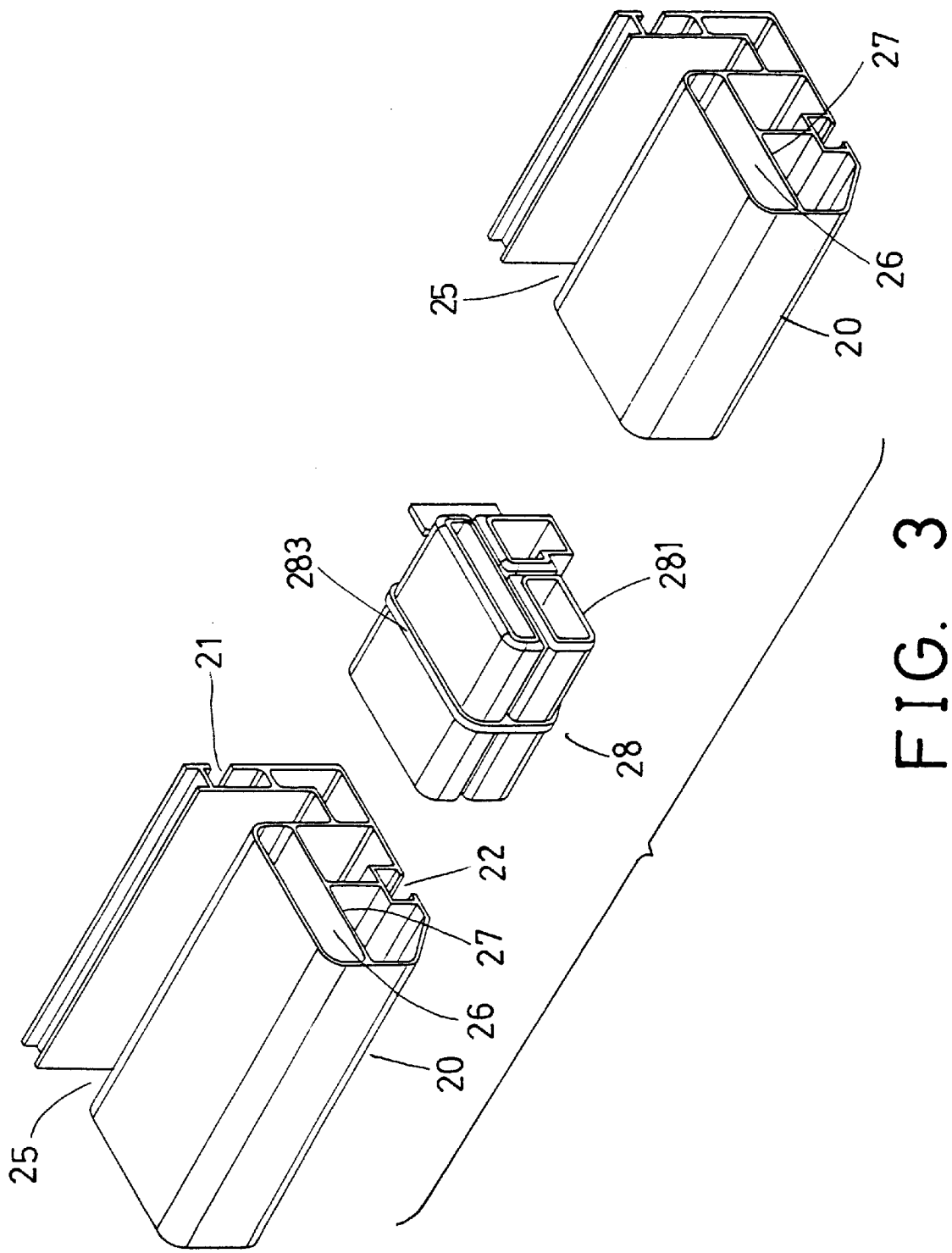
Figure 4:
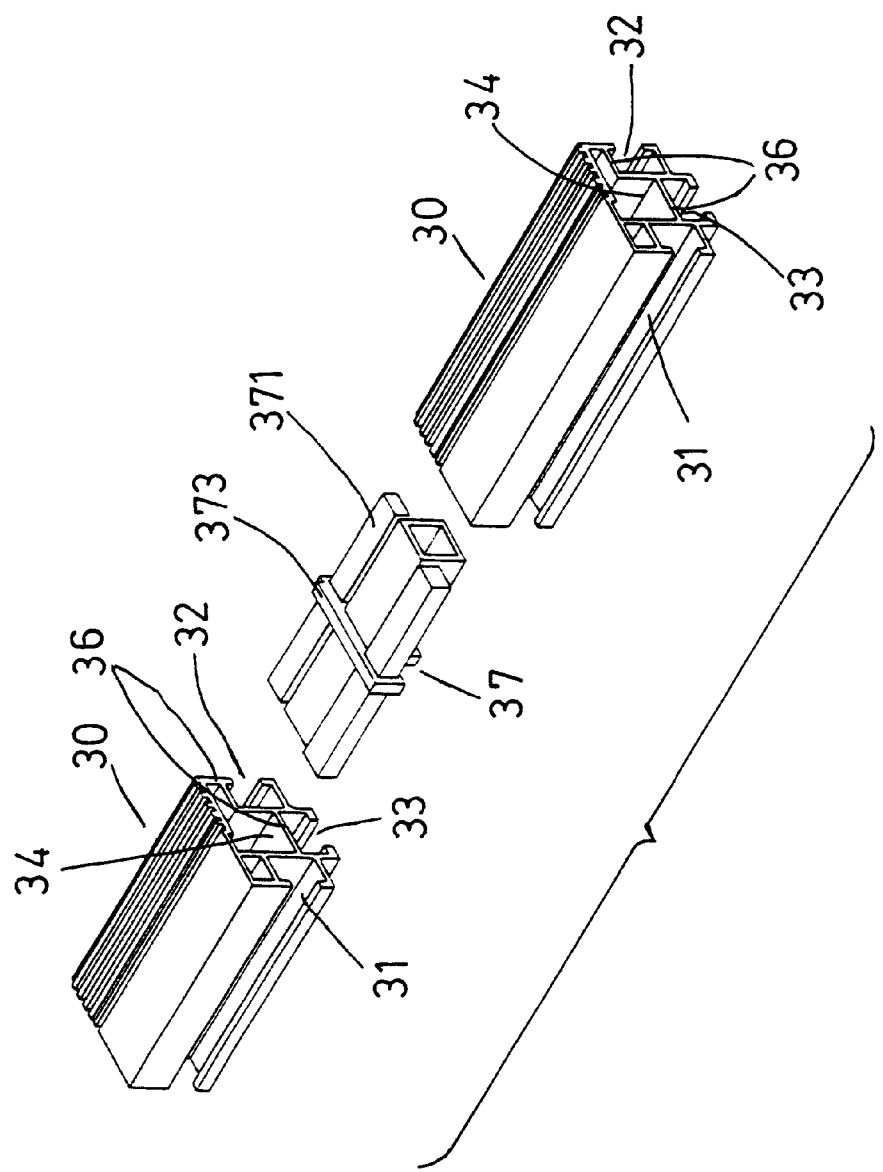

As shown in FIGS. 2–4, the beams 20, 30 each may include one or more segments coupled together with couplers 28, 37 or the like, and each includes one or more cavities 26, 34 formed therein, particularly formed in the end portions and defined by one or more partitions 27, 36. The couplers 28, 37 each includes two sides each having one or more extensions 281, 371 laterally extended outward from a middle wall 283, 373 for engaging into the cavities 26, 34 of the beams 20, 30 and for securing to the beams 20, 30 with such as a force-fitted engagement, and for securing the segments of the beams 20, 30 together. One or more beams 20, 30 may be coupled together with the couplers 28, 37 for supporting or coupling one or more boards 40 together or to the table plate 11. One or more end caps 29, 38 may be provided for engaging into the end portions of the beams 20, 30 and for blocking the cavities 26, 34 of the beams 20, 30.

In operation, one or more boards 40 may be selectively attached or secured to the table plate 11 with the beams 20, 30 and may be supported at a level parallel to or flush with the table plate 11, with the legs 50, for smoothly supporting the work pieces on the table plate 11 and the boards 40. The boards 40 may be easily selected and secured onto the table plate 11 according to the users need or according to the environment around the table plate 11.

As shown in FIG. 1, a board 40 may include one end or one side portion attached to the end portion or the side portion of the table plate 11, and two beams 20 may be secured to the front and the rear portions, or to the opposite side portions of the table plate 11 and the board 40 for securing the board 40 to the end portion of the side portion of the table plate 11 with the beams 20, without the other beams 30. One or more further boards 40 may be attached to the other end or the other side portion or the front or the rear portions of the table plate 11 with two beams without the other beams 30.

Accordingly, the working table in accordance with the present invention includes one or more auxiliary and attachable boards for increasing the working or supporting surfaces or areas for the work pieces.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A working table combination comprising:

a base including a table plate supported on top thereof, at least one board, at least one beam secured to said table plate and to said at least one board for securing said table plate and said at least one board together, said at least one beam including a side portion having a channel formed therein, and a plurality of fasteners engaged in said channels of said at least one beam and engaged with said table plate and said at least one board for securing said table plate and said at least one board together.

2. The working table combination according to claim 1, wherein said at least one beam includes a guide slot formed therein, said working table combination further includes a slide slidably engaged with said guide slot of said at least one beam for slidably securing to said table plate.

3. The working table combination according to claim 1 further comprising means for supporting said at least one board at a level flush with said table plate.

4. A working table combination comprising:

a base including a table plate supported on top thereof, said table plate including two opposite side portions and an end portion, at least one board including an end portion engaged with said end portion of said table plate, and including two side portions in line with said side portions of said table plate, two beams engaged with said side portions of said table plate and said at least one board, said beams each including a side portion having a channel formed therein, and means for securing said table plate and said beams and said at least one board together, said securing means including a plurality of fasteners engaged in said channels of said beams and engaged with said table plate and said at least one board for securing said table plate and said at least one board together.

5. The working table combination according to claim 4 further comprising means for supporting said at least one board at a level flush with said table plate.

6. The working table combination according to claim 4, wherein said beams each includes at least two segments, and at least one coupler engaged between said at least two segments for securing said at least two segments together.

7. The working table combination according to claim 6, wherein said segments of said beams each includes one end having at least one cavity formed therein, said at least one coupler includes two sides each having at least one extension extended therefrom for engaging into said at least one cavities of said segments and for securing said at least two segments together.

8. A working table combination comprising:

a base including a table plate supported on top thereof, at least one board, a beam engaged between said table plate and said at least one board, said beam including two side portions each having a channel formed therein, and means for securing said table plate and said beam and said at least one board together, said securing means including a plurality of fasteners engaged in said channels of said beam and engaged with said table plate and said at least one board for securing said beam between said table plate and said at least one board and for securing said table plate and said at least one board together.

9. The working table combination according to claim 8 further comprising means for supporting said at least one board at a level flush with said table plate.

* * * * *